United States Patent [19]

Kuster

[11] Patent Number: 5,531,259
[45] Date of Patent: Jul. 2, 1996

[54] METHOD FOR INTERMEDIATE CAST TYPE WELDING OF FINELY PEARLITIZED RAILS

[75] Inventor: Frank Kuster, Ratingen, Germany

[73] Assignee: Elektro-Thermit GmbH, Essen, Germany

[21] Appl. No.: 255,686

[22] Filed: Jun. 8, 1994

[30] Foreign Application Priority Data

Jun. 9, 1993 [DE] Germany .................. 43 19 165.7

[51] Int. Cl.⁶ .................................................. B23K 23/00
[52] U.S. Cl. .............................. 164/54; 164/108; 249/86
[58] Field of Search .............................. 164/54, 98, 108; 249/86

[56] References Cited

U.S. PATENT DOCUMENTS 5,078,200  1/1992  Guntermann et al. ................ 164/54

*Primary Examiner*—Kuang Y. Lin
*Attorney, Agent, or Firm*—Anderson Kill Olick & Oshinsky

[57] ABSTRACT

Method for intermediate cast type welding of finely pearlitized rails by pouring steels produced by the Thermit fusion process into a casting mold, which surrounds the two rail ends 13 separated from each other by an intrinsic gap L1, wherein the actual rail gap L1 is increased across the entire rail head width 14 starting on both sides of the rolling surfaces 8 of each rail end 13 in longitudinal –h and vertical –v direction by a dimension of $\frac{1}{10}$ to $\frac{10}{10}$ of the dimension of the intrinsic rail gap L1 to a dimension of L2.

2 Claims, 3 Drawing Sheets

Longitudinal direction of the rail

5,531,259

METHOD FOR INTERMEDIATE CAST TYPE WELDING OF FINELY PEARLITIZED RAILS

FIELD OF THE INVENTION

The invention deals with a method for intermediate cast type welding of finely pearlitized rails by pouring aluminothermically produced steel into a casting mold which surrounds the two rail ends separated from one another by a gap.

BACKGROUND OF THE INVENTION

The wear of a rail is determined at a given load in railroad operation essentially by the strength or hardness of the rails. At present, railroad operators utilize mainly tempered steel with a minimum tensile strength of 900 N/mm² for continuously welded rails. Herein the alloy elements carbon and manganese are available to the rail manufacturer for achieving the strength of the rails. In case of greatly increased loads or stresses, as they occur for instance at arcuate outer rails in curves, the tempered special grade additional alloys with chromium and/or vanadium having a minimum tensile strength of 1100 N/mm² are also utilized.

As an alternative to tempered alloyed special grades there exists also the possibility to achieve high strength by a heat treatment of the rails after the rolling process. Generally, it is usual to limit the heat treatment to the regions of the rails in proximity of the rolling area. Such rails correspond in their chemical composition approximately to the rails with 900 N/mm² minimum tensile strength, wherein the pearlitic texture is extremely finely laminar due to the heat treatment, with the consequence of a correspondingly high hardness or strength.

SUMMARY OF THE INVENTION

The present invention deals with the improvement of the hardness distribution in welds in the head region of this type of rail produced by an aluminothermic process of fusion welding (hereinafter referred to as the Thermit process).

The Thermit fusion type welding process is a fusion welding process which leads to a characteristic formation of a welded region in the form of an intermediate cast region, consisting of steel produced by the Thermit process and dissolved rail steel which is located centrally in the originally existing welding gap between the two rail ends as well as one each zone affected by heat on the right and left hand side of the welding seam.

DETAILED DESCRIPTION

Figure 1A:
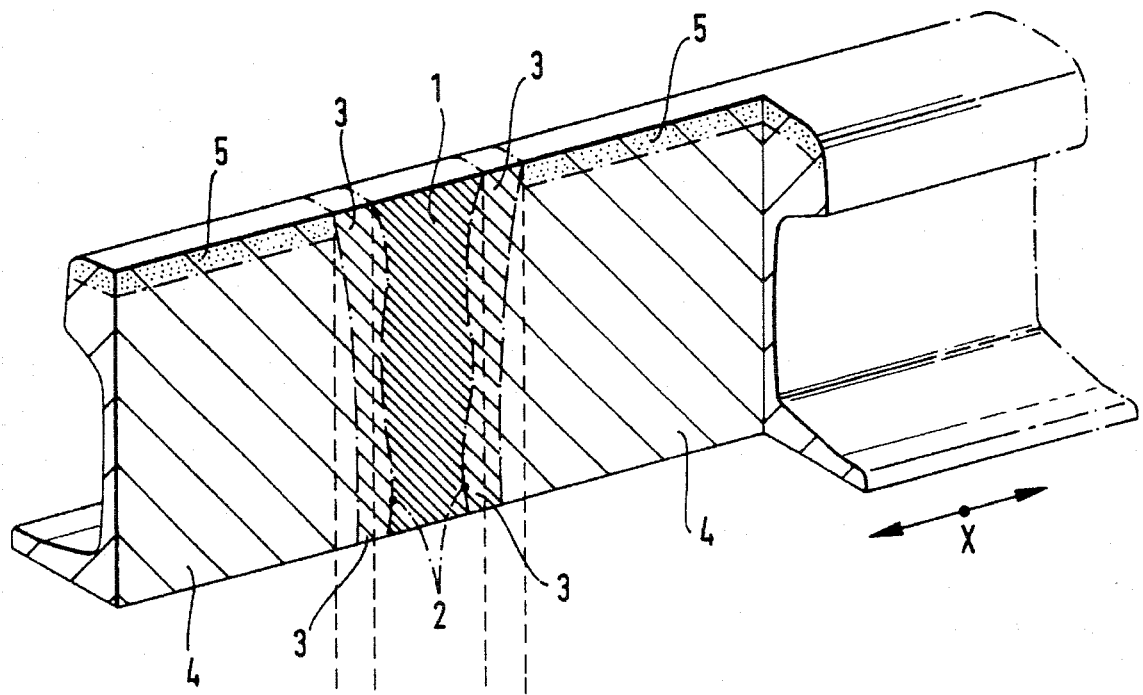
FIG. 1A is a perspective view of a rail with part of the rail being broken away.

FIG. 1A shows these regions in a perspective partial longitudinal section through the plane of symmetry of a finely pearlitized (head hardened) rail in a diagrammatic illustration. Herein the intermediate cast region is designated by the numeral 1, consisting of steel produced by the Thermit fusion process and molten rail steel. The zones bounded by the fusion lines 2 affected by heat flow 3 follow on both sides, which then transit into the region of the rail steel 4 which is not affected by the heat. The finely pearlitized rail head region is designated by the numeral 5.

This formation or construction is of extraordinary significance for the wear behavior in rolling stock operation. The hardness and tantamount with it strength of the welding seam and accompanying it also its resistance to wear can be quite accurately affected by the chemical composition of the steel obtained by the Thermit fusion process at a given cooling velocity. The hardness of the intermediate cast region therefore involves no problem for the welding of the rails viewed from the wear technology point of view. However, the circumstances are different within the two zones affected by the heat. Here, the chemical composition and the cooling velocity together define the distribution of the hardness. Viewed in rail longitudinal direction the hardness within the zones affected by the heat diminishes continuously in rail longitudinal direction X with increasing distance from the center of the weld, until a minimum value at the boundary of the zone affected by the heat flow to the rail steel not affected by the heat passed. Here we are faced with the so-called soft-annealed region. Since the resistance to wear drops also with diminishing hardness, increased wear especially in the zones influenced by the heat in the course of rolling stock operation has to be expected.

The reduced hardness within the zones influenced by the heat is caused by reasons of metallurgical physics. In the predominant portion of the zones affected by the heat adjacent to the intermediate cast regions, the rail steel is austenitized, while in the portion of the heat-affected zones located further away from the welding seam a maximum temperature in the rail of 600° to 700° C. is attained. During the cooling of the weld differing texture structures in the zones affected by the heat are segregated:

at the fusion line, i.e., in the transition region between the intermediate cast zone and the heat-affected zone, there exists, for example, a coarse-grained hard pearlite;

in the transition region between the heat-affected zone and the heat-nonaffected zone of the rail metal, i.e., at the end of the heat-affected zones, there exists a spheroidized, globular, soft pearlite.

Since the cooling velocity of the Thermit weld as well as the chemical composition of the rail is predetermined, a specific texture and with this a specific hardness distribution in the zones influenced by the heat viewed in a rail longitudinal direction is established depending upon the grade of the steel used for the rails.

When welding tempered rails, which were thus not subjected to any heat treatment by the rail manufacturers after the rolling process, there results the hardness distribution within the zones influenced by the heat depending upon the chemical composition of the steel used for the rails. The alloy elements C, Mn, V, Cr, among others, affect the hardness level through the transformation behavior of the rail steel and/or through the carbide formation. The hardness of the rail unaffected by the heat is however also controlled by these two mechanisms, namely during the cooling after the rolling process. In welding such tempered rails approximately always the same differential amount between the hardness of the unaffected rail and the hardness distribution in the zones affected by the heat is established independently of the analysis of the steel used for the rails. The differential amount can be tolerated in such Thermit type welds as far as wear is concerned.

In case of a post-heat treated finely pearlitized rail where the hardness level is "artificially" raised after the rolling process, a larger differential value between the two hardnesses is established, since the originally finely laminar pearlite texture is destroyed and the hardness distribution in the zones affected by the heat is then obtained after the welding process automatically just as in the welded, tempered rail at 900 N/mm$^2$ minimum tensile strength. This is caused by the identical chemical composition of the two steel qualities used for the rails.

Figure 1B:
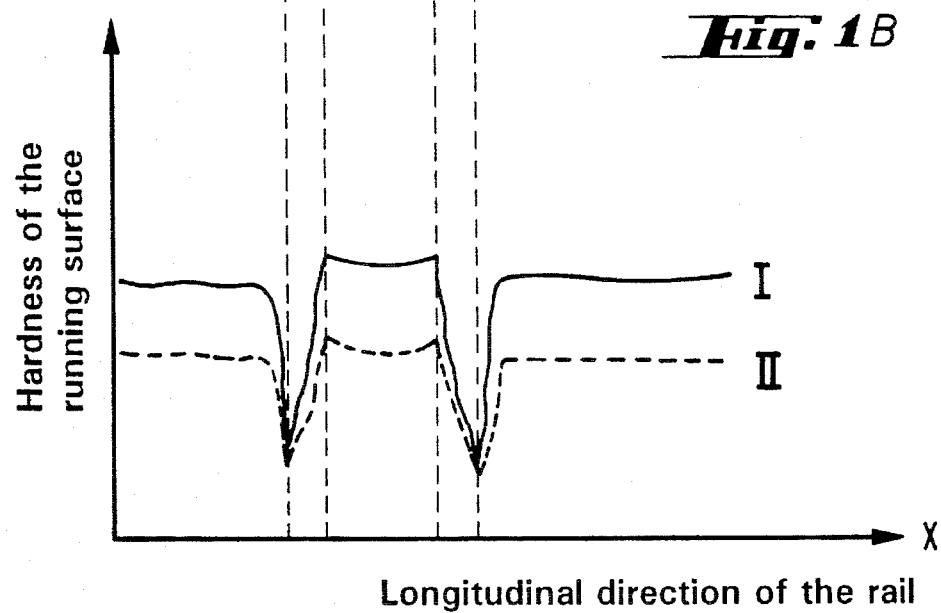
FIG. 1B is a graph showing the hardness of the running surface plotted v. longitudinal direction of the rail illustrated in FIG. 1A.

The respective hardness distribution at the rolling surface in rail longitudinal direction is shown in the bottom portion (FIG. 1B) of the diagrammatic illustration in FIG. 1. Herein I corresponds to the hardness distribution of a weld of finely pearlitized (head hardened) rail and II corresponds to the hardness distribution of a weld of tempered rails having a minimum tensile strength of 900 N/mm$^2$. The rolling contact level of the finely pearlitized rail will be subjected to a relatively higher wear in the region of the zones affected by the heat compared to the welded material and the unaffected rail than is the case with welding of tempered rails. For this reason, increased requirements are demanded of the welding type technology when dealing with finely pearlitized rails.

In actual practice two methods for Thermit fusion intermediate cast type welding have been particularly proved in service and have been successful. Herein, we are dealing with the methods in the DE-PS 22 08 692 and the DE-PS 21 61 134.

The Thermit rail welding process is as a rule performed on already laid rails. Herein, the rails are laid in such a way, that a gap exists between the rail ends. The spacing of the two end faces of the rails from one another is the rail gap. In the course of the welding process the two rail ends are surrounded by a mold and the steel produced by the Thermit process is poured into the mold and fills up the gap. It depends on the Thermit welding process how wide the gap is to be. One distinguishes between two methods.

1. WELDING WITH PREHEAT

Here the two rail ends already surrounded by the mold are heated to a high temperature by the flame of a burner. Only a relatively small quantity of heat produced by the Thermit process is required in order to melt the end faces of the rails during the welding process and to fill the gap with the molten steel produced by the Thermit process. The rail herein corresponds to one to two times the thickness of the rail web meaning 16 to 32 mm, preferably, 16–20 mm.

The method in DE-PS 22 08 692 is characterized by the combination of the following features:

a) the width of the gap between the rail ends to be welded together is adjusted to amount to 1 to 2 times the thickness of the rail web;

b) the cavity in the casting mold is selected in such a way, that there results a width for the welding bead amounting to 2 to 4 times and the width amounting to 0.15 to 0.6 times of the thickness of the rail web; and c) the width of the flame band of the preheating burner is adjusted to 1.5 to 2.5 times the thickness of the rail web.

This type of performing the rail welding requires a preheating period of approximately 6 to 10 minutes for the rail ends which have to be welded to one another and which are embraced by the mold halves.

2. WELDING WITH SHORTENED PREHEATING

In this method the rail ends are preheated only during a time span of a maximum two minutes to a temperature between 300° C. and 700° C. This preheat is considered shorter than in the first method. Here a greater quantity of molten steel produced by the Thermit process must be introduced in order to melt the rail ends, so as to achieve a sound connection with the steel produced in the Thermit process. In this method the gap must naturally be wider. Generally, the gap width amounts herein to around 24 mm.

The width of the rail gap is thus a function of the method and can thus, depending upon the method used, amount to between 16 mm to 32 mm, preferably, 18 mm–24 mm.

The method according to the DE-PS 21 61 134 is characterized in that the rail ends which have to be welded together are preheated within a time period of a maximum of 2 minutes to a temperature of at least 300° C. and at the most 700° C., wherein the weight of the Thermit mixture amounts to 0.15 to 0.25 of the weight shares of the weight per meter of the rails which have to be welded together. This method is designated as the welding method with short preheating (SkV).

This heat temperature gradient in rail longitudinal direction due to the short preheating period of the SkV-method causes lower spread of the zones influenced by the heat compared to the method with normal preheating periods. The drop of the hardness in the heat affected zones is thus limited to a smaller region viewed in rail longitudinal direction due to the SkV-method, which has a favorable effect upon the wear behavior in actual rolling stock operation. For this reason this method is particularly preferred for the purposes of the present invention.

The formation of the intermediate cast region and of the zones influenced by the heat in a SkV-welding can be affected by modification of the welding method. Thus, for instance, a greater dispersion at the ends of the rails can be forced in a not-too-thick layer beneath the rolling surface with the consequence of an enlarged intermediate cast region viewed in rail longitudinal direction. This results in approach of the fusion line to the rolling surface of the rail near a region unaffected by the heat, which region is solely decisive for the wear of the rail and the weld. A suitable technology enables on the other hand to keep the formation of the intermediate cast region and of the heat affected zones in the remaining rail cross-section unchanged, so that the external boundary of the heat affected zones is "fixed or retained" at the rolling surface. The heat affected zones are in this case reduced viewed in rail longitudinal direction. The drop of the hardness in the heat affected zones of the region in proximity of the rolling surface is then naturally limited to a narrower region than is the case in the standard SkV method, which circumstance has a favorable effect upon the wear.

An improvement of the hardness distribution in the heat affected zones can also occur in a known manner by an additional heat treatment of the rails in the weld region. Usually such a heat treatment is conducted irrespectively whether the Thermit fusion welding process or a pressure butt welding has been performed is conducted, if the weld has cooled to ambient temperature or at least to a temperature below 700° C. meaning to a temperature where the austenite-pearlite transformation has been terminated. The weld is again austenitized by a suitable gas burner device and is subsequently cooled in an accelerated manner by application of compressed air or a compressed air-water mixture or a cooling medium having the same effect. This method has however the disadvantage, that it is difficult to perform on a rail which has already been laid and in addition because an extensive amount of apparatus is required which has to be transported to the building sites.

A method for intermediate cast type welding of finely pearlitized rails is known from the DE-OS 40 06 071, whose aim is the improvement of the hardness distribution in the heat affected zones of the rails in the weld region. This method is characterized in that compressed air is applied to the rail head surface of the rail segment adjacent to the two casting mold halves after having poured the molten steel up to its solidification, in particular up to the shearing off of the protruding welded material and the casting mold halves. Preferably, the application of the compressed air is continued and the intermediate cast region is included in the cooling after the protruding welding material and the casting mold halves have been sheared off.

The present invention deals with the technical problem of further improving the hardness distribution in the heat affected zones of the regions in proximity of the rolling surface without having to reheat the welding point, this in the Thermit fusion intermediate cast type welding of finely pearlitized rails.

Figure 2:
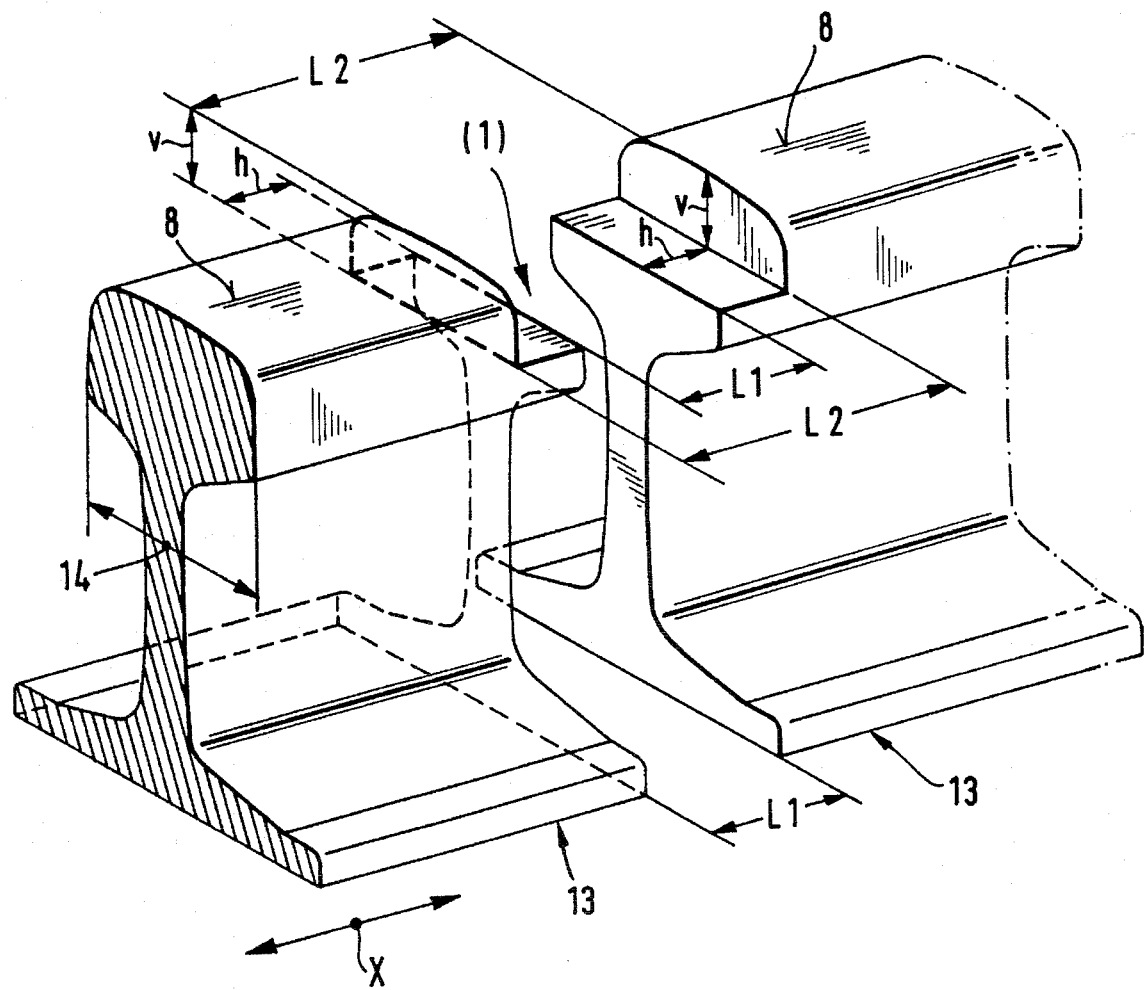
FIG. 2 is a perspective view of a rail according to the present invention.

This task is solved in the invention by specific three-dimensional configuration of the rail gap between the two rail ends that have to be welded to one other (compare FIG. 2).

The subject of the present invention consists in increasing the intrinsic rail gap L1 across the entire rail head width 14 starting on both sides of the rolling surface 8 of each rail end 13 in longitudinal–h and vertical–v direction by a dimension of $1/10$ to $10/10$ of the dimension of the intrinsic rail gap L1 to a dimension L2. The rail gap L1 may be increased by grinding and/or milling the rail in a manner known as such.

The gap L2 is thus increased in the rail head region 8 in proximity of the rolling surface compared to the remaining head-, web- and rail-base gap region L1. Since these gaps L1 and L2 are filled with liquid welding material when pouring the steel produced by the Thermit process out of the reaction crucible, a larger intermediate cast region L2 is formed in the zone 8 in proximity of the rolling surface than in the entire remaining rail cross-sectional region L1. The larger intermediate cast region guarantees the already described "fixation or holding" of the outer boundary of the heat affected zones in the rolling surface 8. Since, however, the intermediate cast region in rail longitudinal direction X is increased L2 in the area 8 in proximity of the rolling surface, the width of the heat affected zones diminishes there by same amount. The hardness and accompanying this the wear behavior of the intermediate cast region is controlled by the chemical composition of the steel produced by the Thermit fusion method and does not constitute a problem. The now small extent of the heat affected zones is of decisive significance when viewed from the wear aspect.

After the welding process has been terminated cooling of the two rolling surfaces according to the DE-OS 40 06 071 can be performed. It is performed directly on the right and left hand side next to the casting mold halves after the molten steel has been poured. Hereby, so much heat is dissipated from the welding region in spite of its being covered by the two mold halves, the heat affected zones in proximity of the rolling surface, which are unavoidably formed, come out to be narrower and over and above that have a significantly lower hardness drop.

After additional cooling, grinding of the rail head true to its profile can occur in a manner known as such.

Figure 3:
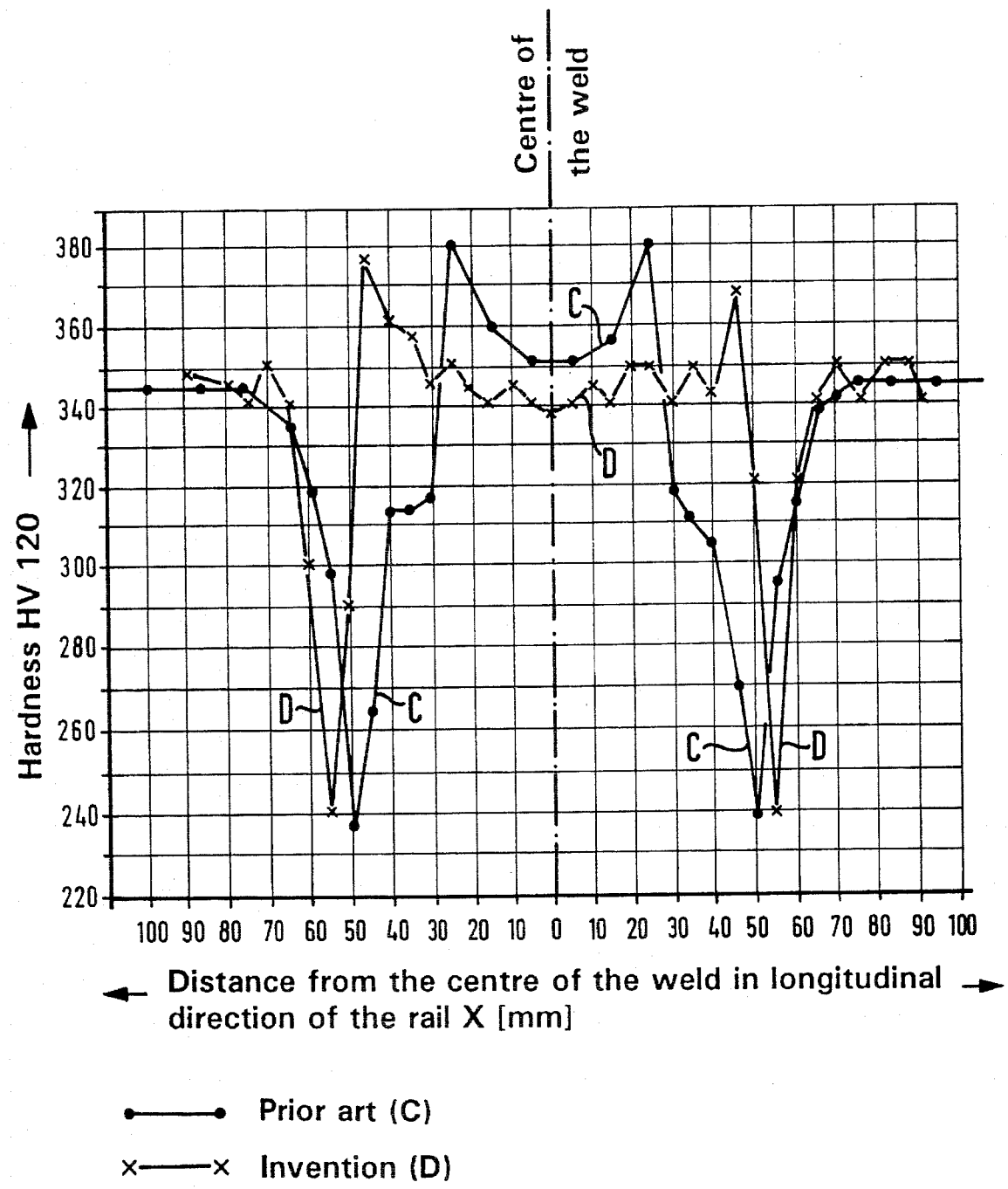
FIG. 3 is a graph showing Vickers Hardness plotted v. the distance from the center of the weld in longitudinal direction of the rail X.

In order to substantiate the superior properties achievable by the method in the invention, FIG. 3 shows the hardness curve D of a welding point obtained according to the method in the invention compared to the hardness curve C of a welding point without the inventive casting gap geometry together with cooling air application. The welding was performed on finely pearlitized UIC-60-rails. The method in the DE-PS 21 61 134 (SkV-method) was used. The preheating period was two minutes. The Thermit fusion reaction mixture was treated with alloy additives of such a type and quantity, that the hardness of the intermediate cast regions corresponded to that of the finely pearlitized rail. The gap in the region near the rolling surface was larger by $6/10$ than that in the remaining rail cross-sectional area.

When the inventive method is used the hardness distribution curve D is obtained at the rolling surface, without using the inventive method the hardness distribution curve C in FIG. 3 is obtained.

It is evident that the hardness curve D in the heat affected zones of the modified welding process must be judged to be more favorable as far as wear behavior in actual rolling stock operation is concerned than the hardness curve C in the heat affected zones of the standard SkV-welding. The hardness valley is clearly narrower in rail longitudinal direction X. This results from the displacement of the fusion line further outward with at the same time almost unchanged position of the smallest hardness value. Since this smallest hardness value characterizes or designates the end of the heat affected zone, it is possible to make the statement, that the spread of the heat affected zones in rail longitudinal direction X is expediently smaller. It is smaller due to the increased intermediate cast region L2 as FIGS. 2 and 3 show.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A method of intermediate cast welding of finely pearlitized rails by pouring aluminothermically produced steel in a casting mold which surrounds ends of a pair of rails, said method comprising the step of:

providing in a rail head of each rail along an entire rail head width, at an end face of an rail end facing an end face of another rail end, a recess having a width and a height each substantially equal from $1/10$ to $10/10$ of a gap separating webs and feet of the ends of the pair of rails, when the ends of the pair of rails are received in the casting mold whereby, upon the ends of the pair of rails being received in the casting mold, an increased gap is provided at rolling surfaces of the ends of the pair of rails; and pouring aluminothermically produced steel into the casting mold.

2. A method according to claim 1, wherein said providing step comprises providing a recess having a width and a height each equal to $6/10$ of the separating gap.

* * * * *